P. J. KENNY.
TRACTION ATTACHMENT FOR WHEELS.
APPLICATION FILED FEB. 19, 1921.
1,426,199.
Patented Aug. 15, 1922.
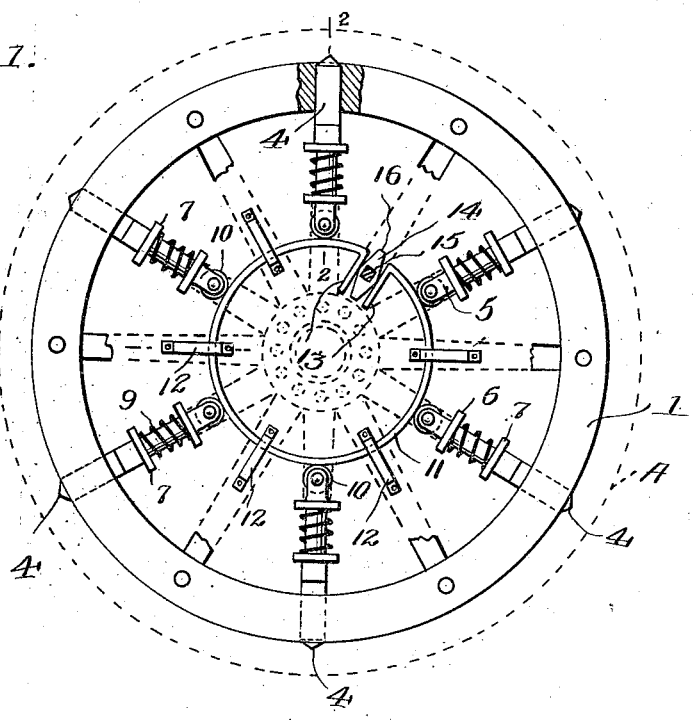
Fig. 1.
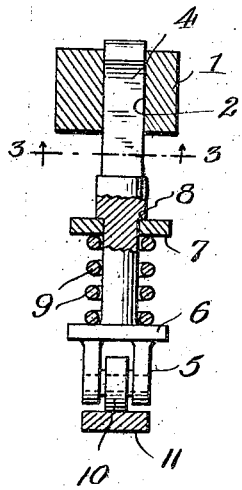
Fig. 2.
Fig. 3.
Fig. 4.
PHILIP J. KENNY
INVENTOR
BY Victor J. Evans
ATTORNEY

UNITED STATES PATENT OFFICE.

PHILIP J. KENNY, OF CHICAGO, ILLINOIS.

TRACTION ATTACHMENT FOR WHEELS.

1,426,199.  Specification of Letters Patent.  Patented Aug. 15, 1922.

Application filed February 19, 1921. Serial No. 446,453.

*To all whom it may concern:*

Be it known that I, PHILIP J. KENNY, a citizen of the United States, residing at Chicago, in the county of Cook and State of Illinois, have invented new and useful Improvements in Traction Attachments for Wheels, of which the following is a specification.

This invention relates to a traction attachment for motor vehicle wheels and an object of the invention is to provide means which may be permanently carried by the drive or traction wheels of a motor vehicle and normally maintained in inoperative position which means may be quickly and easily projected into operative position for increasing the tractive proclivities of a vehicle when conditions necessitate.

Another object of this invention is to provide a traction attachment as specified which comprises an extensible ring against which a plurality of projectable traction members engage, the said members being projected into operative position by the extension of the extensible ring.

Other objects of the invention will appear in the following detailed description and in the accompanying drawing wherein:

Fig. 1 is a side elevation of the improved traction attachment.

Fig. 2 is a detail section through the traction attachment taken on the line 2—2 of Fig. 1.

Fig. 3 is a detail cross section taken on the line 3—3 of Fig. 2.

Fig. 4 is a detail section.

Referring more particularly to the drawing the improved traction attachment for motor vehicles comprises an auxiliary rim 1 which is attached in any suitable manner to the rim of the vehicle wheel preferably at its outer side. The auxiliary rim 1 is provided with a plurality of openings 2 formed therein and radiating from the axis of rotation of the vehicle wheel indicated at A, upon which the traction attachment is mounted. Traction spurs 4 extend through the openings 2 and have their outer ends substantially pyramidal in shape to increase the tractive proclivities of the wheel A when the traction spurs 4 are projected into operative position. The inner ends of the traction spurs 4 are forked as shown at 5 and each of the spurs has a substantially disk like enlargement 6 thereon. A washer 7 is slidably mounted on each of the traction spurs 4 and its outward movement is limited by an annular shoulder 8 formed on the spurs. Spiral springs 9 are coiled about the spurs 4 between the washers 7 and enlargements 6 urging the rollers 10, which are carried by the forked ends 5, into engagement with the perimeter of an extensible ring 11. The portions of the traction spurs 4 which project through the auxiliary rim 1 are square in cross section to prevent rotary movement of the spurs relative to the rim.

The expansible ring 11 is guided in its expanding movement by guiding brackets 12 which are carried by the alternate spokes of the wheel A as clearly shown in Fig. 1 of the drawing. The expansible ring 11 has its ends inturned and parallel one to the other as shown at 13 and an expanding cam 14 is substantially diamond shaped and positioned between the facing sides of the inturned ends 13. The expanding cam 14 is carried by a rock shaft 15 and is adapted to be rotated by rotation of the shift for supporting the inturned ends 13 for expanding the ring 11 and forcing the traction spurs 4 outwardly beyond the tread portion of the tire of the wheel A and into position to bite into the surface over which the wheel A is traveling.

The ends of the expanding cam 14 are preferably flat as shown at 16 to prevent accidental turning movement of the cam upon the application of pressure to the traction studs 4 during use.

It is, of course, to be understood that the invention may be constructed in various other manners and the parts associated in different relations and, therefore, I do not desire to be limited in any manner except as set forth in the claims hereunto appended.

Having thus described my invention what I claim is:

1. In a traction attachment an auxiliary rim, a plurality of traction studs projecting through said auxiliary rim, an extensible ring, rollers carried by said studs and engaging the perimeter of said ring whereby upon extension of said ring, said studs will be forced into operative position.

2. In a traction attachment, an auxiliary rim, a plurality of traction studs extending through said rim and normally resting in inoperative position, rollers rotatably carried by the inner ends of said studs, an expansible ring engaging said rollers and having its ends inturned, an expanding cam between said inturned ends and adapted to expand said ring for forcing said studs into operative position.

3. In a traction attachment, an auxiliary rim, a plurality of traction studs extending through said rim and normally resting in inoperative position, rollers rotatably carried by the inner ends of said studs, an expansible ring engaging said rollers and having its ends inturned, an expanding cam between said inturned ends and adapted to expand said ring for forcing said studs into operative position, said cam provided with flat portions at its maximum radii to hold said ring expanded.

4. In a traction attachment, an auxiliary rim, a plurality of traction studs extending through said rim and normally resting in operative position, rollers rotatably carried by the inner ends of said studs, an expansible ring engaging said rollers and having its ends inturned, an expanding cam between said inturned ends and adapted to expand said ring for forcing said studs into inoperative position, said cam provided with flat portions at its maximum radii to hold said ring expanded, and yieldable means for maintaining said rollers in engagement with the perimeter of said expansible ring.

5. In combination a rim, studs slidably supported thereby, a split ring having an operative connection with said studs and a device for spreading the ends of the ring and thereby expanding the ring for sliding said studs.

In testimony whereof I affix my signature.

PHILIP J. KENNY.